(12) United States Patent
Miller (10) Patent No.: US 9,646,496 B1
(45) Date of Patent: May 9, 2017

(54) SYSTEMS AND METHODS OF CREATING AND BLENDING PROXY DATA FOR MOBILE OBJECTS HAVING NO TRANSMITTING DEVICES

(71) Applicant: Siemens Industry, Inc., Alpharetta, GA (US)

(72) Inventor: David Dodd Miller, Austin, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/091,194

(22) Filed: Apr. 5, 2016

Related U.S. Application Data (60) Provisional application No. 62/277,297, filed on Jan. 11, 2016.

(51) Int. Cl.
*G08G 1/07* (2006.01)
*G08G 1/095* (2006.01)

(52) U.S. Cl.
CPC .............. *G08G 1/07* (2013.01); *G08G 1/095* (2013.01)

(58) Field of Classification Search
CPC .................................. G08B 1/07; G08G 1/095
USPC .................... 340/909, 910, 916, 917
See application file for complete search history.

(56) References Cited

U.S. PATENT DOCUMENTS

| | | | |
|---|---|---|---|
| 8,344,909 B2 | 1/2013 | Teffer et al. | |
| 8,386,156 B2 | 2/2013 | Miller | |
| 8,442,749 B2 | 5/2013 | Teffer et al. | |
| 8,519,868 B2 | 8/2013 | Nadeem et al. | |
| 8,531,520 B2 | 9/2013 | Stricklin et al. | |
| 8,762,037 B2 | 6/2014 | Teffer et al. | |
| 8,976,041 B2 | 3/2015 | Buckel | |
| 9,013,325 B2 | 4/2015 | Miller et al. | |
| 9,031,758 B1* | 5/2015 | Goudy | G08G 1/163 701/70 |
| 9,135,824 B1 | 9/2015 | Collar | |
| 2012/0029798 A1 | 2/2012 | Miller | |
| 2016/0086285 A1* | 3/2016 | Jordan Peters et al. | G06Q 40/08 705/4 |

\* cited by examiner

*Primary Examiner* — Tai T Nguyen (57) ABSTRACT

A connected traffic safety system comprises at least one roadside unit and a vehicle detection device. The roadside unit is configured to transmit wireless signals and receive corresponding responses from a corresponding wireless device of an Onboard Unit (OBU)-equipped vehicle, and to send at least one of vehicle location data, direction heading data, elevation data and speed data from the OBU-equipped vehicle to a traffic signal controller. The vehicle detection device is configured to generate vehicle detection data of at least one non-Onboard Unit (OBU)-equipped vehicle. The roadside unit to receive the vehicle detection data for creating a proxy data wireless message for the non-Onboard Unit (OBU)-equipped vehicle. The roadside unit to mimic the proxy data wireless message as a first Basic Safety Message (BSM) for the non-Onboard Unit (OBU)-equipped vehicle that would have been available to the Onboard Unit (OBU)-equipped vehicle present nearby.

6 Claims, 7 Drawing Sheets

SYSTEMS AND METHODS OF CREATING AND BLENDING PROXY DATA FOR MOBILE OBJECTS HAVING NO TRANSMITTING DEVICES

CROSS REFERENCE TO RELATED APPLICATIONS

This application claims the benefit of U.S. Provisional Application Ser. No. 62/277,297 entitled "SYSTEM AND METHOD TO CREATE AND BLEND PROXY DATA FOR MOBILE OBJECTS HAVING NO TRANSMITTING DEVICES," filed on Jan. 11, 2016, the contents of which are hereby incorporated by reference herein in their entirety.

BACKGROUND

1. Field

Aspects of the present invention generally relate to connecting vehicular traffic on roadways for generating traffic safety warnings and more specifically relate to creating and blending proxy data for mobile objects having no transmitting devices with data from connected vehicles.

2. Description of the Related Art

Connected vehicles are becoming a reality, which takes driver assistance towards its logical goal: a fully automated network of cars aware of each other and their environment. A connected vehicle system makes mobility safer by connecting cars to everything.

Vehicular communications systems are networks in which vehicles, personal mobile devices (Onboard Units or OBUs) and roadside units (RSUs) are the communicating nodes, providing each other with information, such as safety warnings and traffic information. They can be effective in avoiding crashes and traffic congestion. Both types of nodes are generally dedicated short-range communications (DSRC) devices. DSRC works in 5.9 GHz band with bandwidth of 75 MHz and approximate range of 1000 m.

Vehicular communications systems are usually developed as a part of intelligent transportation systems (ITS). For example, a Vehicle to Vehicle (V2V) communications system is an automobile technology designed to allow automobiles to "talk" to each other. These systems generally use a region of the 5.9 GHz band set aside by the United States Congress in 1999, the unlicensed frequency also used by Wi-Fi. The V2V communications system is currently in active development by many car makers.

U.S. Department of Transportation studies indicate that 80% of the non-impaired highway fatalities could be avoided if each vehicle were aware of the traffic signal countdown to red and aware of nearby vehicles on a collision course. The National Highway Transportation Safety Agency has begun rulemaking for legislation requiring new vehicles to be equipped with an On-Board Unit (OBU) that privately and securely: a). transmits vehicle location, heading and speed to nearby vehicles ten times per second, b). receives location heading and speed from nearby vehicles, c). receives lane locations from a Roadside Unit (RSU), d). receives traffic signal countdown from the RSU, and e). receives associated signal phase to lane from the RSU to know which signal to obey.

Vehicles use this data to provide driver warnings for collisions with other vehicles and to warn drivers of red light violations before they occur. This technology has at least four shortcomings: a). no technology exists that allows new vehicles equipped with OBUs to be aware of unequipped vehicles, b). requires installation of an OBU in all vehicles to realize the full safety benefits by the new vehicles, c). the slow penetration of new vehicles results in a mixture of equipped and unequipped vehicles for years, d). although OBUs are private and secure, many drivers balk at any device that transmits vehicle data, and e). drivers balk at the purchase of safety devices or APPs.

Therefore, there is a need for improvements in assisting traffic control for generating traffic safety warnings in a connected vehicle system.

SUMMARY

Briefly described, aspects of the present invention relate to a mechanism to create and blend proxy data for mobile objects having no transmitting devices with data from connected vehicles. In particular, a connected vehicle system allows new vehicles equipped with On-Board Units (OBUs) to be aware of unequipped vehicles, it does not require OBUs in all vehicles to realize the full safety benefits, it provides safety benefits during the years while penetration of new vehicles replaces the old, there is no transmission of location from unequipped vehicles, there is no cost to drivers, such as aftermarket devices or software apps and no choice to refuse participation by unequipped drivers. One of ordinary skill in the art appreciates that such a connected vehicle system can be configured to be installed in different environments where vehicular communication between vehicles and Roadside Units (RSUs) is used, for example in providing each other with information, such as traffic safety warnings to provide driver warnings for collisions with other vehicles and traffic information which can be effective in avoiding traffic congestion.

In accordance with one illustrative embodiment of the present invention, a method is described for controlling traffic of vehicles on roadways and generating warnings. The method comprises receiving vehicle detection data of at least one non-Onboard Unit (OBU)-equipped vehicle at at least one roadside unit to create a proxy data wireless message for the at least one non-Onboard Unit (OBU)-equipped vehicle as if the at least one non-Onboard Unit (OBU)-equipped vehicle is equipped with an Onboard Unit (OBU) and mimicking the proxy data wireless message as a first Basic Safety Message (BSM) for the at least one non-Onboard Unit (OBU)-equipped vehicle that would have been available to an Onboard Unit (OBU)-equipped vehicle present nearby to enable the Onboard Unit (OBU)-equipped vehicle equipped with an Onboard Unit (OBU) to be aware of a presence of the at least one non-Onboard Unit (OBU)-equipped vehicle.

Consistent with another embodiment, a connected vehicle traffic safety system is described. The system comprises at least one roadside unit located at an intersection or near a roadway and a vehicle detection device disposed on or near the roadway on which at least one non-Onboard Unit (OBU)-equipped vehicle is travelling. The roadside unit comprises at least a processor and a wireless transceiver. The roadside unit is configured to transmit wireless signals and receive corresponding responses from a corresponding wireless device of an Onboard Unit (OBU)-equipped vehicle, and to send at least one of vehicle location data, direction heading data, elevation data and speed data from the OBU-equipped vehicle to a traffic signal controller. The vehicle detection device is configured to generate vehicle detection data of the at least one non-Onboard Unit (OBU)-equipped vehicle. The at least one roadside unit is configured to receive the vehicle detection data of the at least one non-Onboard Unit (OBU)-equipped vehicle to create a proxy data wireless message for the at least one non-Onboard Unit (OBU)-equipped vehicle as if the at least one non-Onboard Unit (OBU)-equipped vehicle is equipped with an Onboard Unit (OBU) and mimic the proxy data wireless message as a first Basic Safety Message (BSM) for the at least one non-Onboard Unit (OBU)-equipped vehicle that would have been available to the Onboard Unit (OBU)-equipped vehicle present nearby to enable the Onboard Unit (OBU)-equipped vehicle equipped with an Onboard Unit (OBU) to be aware of a presence of the at least one non-Onboard Unit (OBU)-equipped vehicle.

According to yet another embodiment of the present invention, a roadside unit is described. The roadside unit comprises a processor, one or more wireless transceivers and a storage media coupled to the processor to store a software module. The software module to receive vehicle detection data of at least one non-Onboard Unit (OBU)-equipped vehicle to create a proxy data wireless message for the at least one non-Onboard Unit (OBU)-equipped vehicle as if the at least one non-Onboard Unit (OBU)-equipped vehicle is equipped with an Onboard Unit (OBU) and mimic the proxy data wireless message as a first Basic Safety Message (BSM) for the at least one non-Onboard Unit (OBU)-equipped vehicle that would have been available to an Onboard Unit (OBU)-equipped vehicle present nearby to enable the Onboard Unit (OBU)-equipped vehicle equipped with an Onboard Unit (OBU) to be aware of a presence of the at least one non-Onboard Unit (OBU)-equipped vehicle.

DETAILED DESCRIPTION

To facilitate an understanding of embodiments, principles, and features of the present invention, they are explained hereinafter with reference to implementation in illustrative embodiments. In particular, they are described in the context of a connected vehicle system for traffic control and monitoring for generating warnings. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In a connected vehicle system, some vehicles are equipped with an On-Board Unit (OBU). The connected vehicle system serves at least one non-Onboard Unit (OBU)-equipped vehicle and uses at least one Roadside Unit (RSU). The OBU privately and securely transmits vehicle location, heading, elevation and speed to nearby vehicles, receives location heading, elevation and speed from nearby vehicles, receives lane locations from a Roadside Unit (RSU), receives traffic signal countdown from the RSU, and receives associated signal phase to lane from the RSU.

Figure 1:
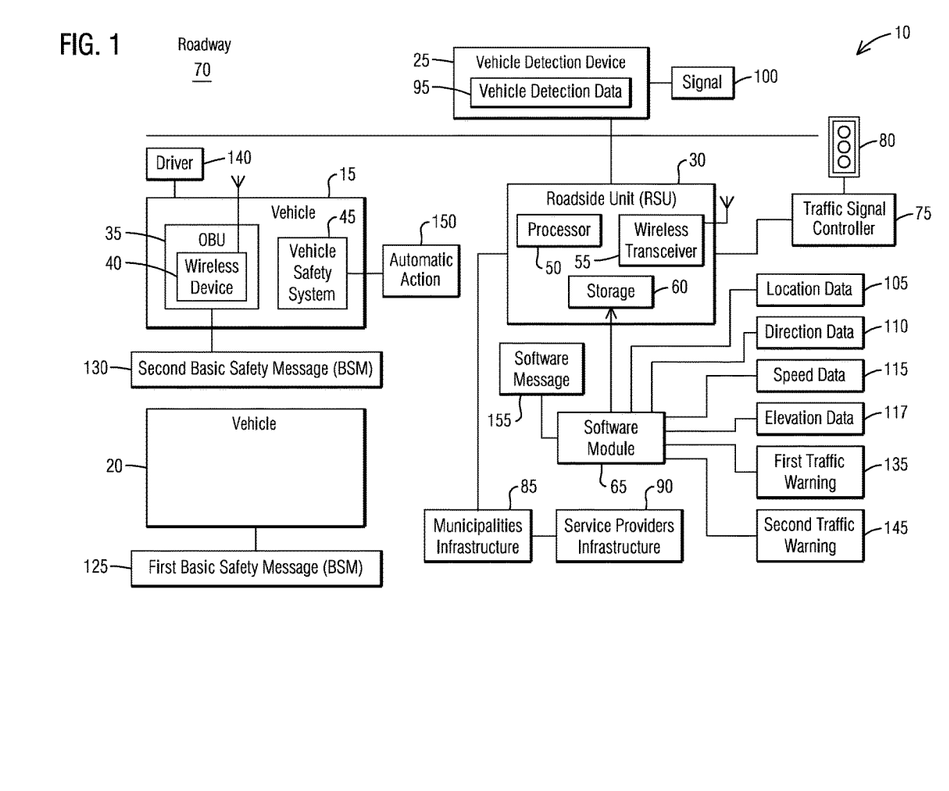
FIG. 1 illustrates a schematic of a connected vehicle system that controls and monitors traffic for generating traffic safety warnings in accordance with an exemplary embodiment of the present invention.

FIG. 1 illustrates a schematic of a connected vehicle traffic safety system 10 for traffic control and monitoring for generating warnings in accordance with an exemplary embodiment of the present invention. The connected vehicle traffic safety system 10 provides vehicular communications as a part of an intelligent transportation system (ITS). The connected vehicle traffic safety system 10 may enable a network for vehicular communications in which an Onboard Unit (OBU)-equipped vehicle 15, a non-Onboard Unit (OBU)-equipped vehicle 20 with help of a vehicle detection device 25, and a Roadside Unit (RSU) 30 act as communicating nodes, providing each other with information, such as safety warnings and traffic information. The RSU 30 has one or more wireless transceivers such as Ethernet, DSRC, Cellular and Wi-Fi that can be used interchangeably.

Consistent with one embodiment, these types of communicating nodes may use dedicated short-range communications (DSRC) devices. DSRC work in the 5.9 GHz frequency band with bandwidth of 75 MHz and has an approximate range of 1000 m. Alternatively however, 5G cellular communications technology or protocols, devices may replace the DSRC devices in the connected vehicle traffic safety system 10 for creating standard messages for the old cars and blending them with compatible messages of the new cars.

As used herein, "a vehicle V equipped with an Onboard Unit (OBU)" refers to a vehicle that connects to sensors, decision-making systems and control systems for enabling a safety system for connected and unconnected vehicles. As used herein, "a non-Onboard Unit (OBU)-equipped vehicle or a vehicle V unequipped with an Onboard Unit (OBU)" refers to a vehicle that does not have an OBU installed on it but connects to sensors, decision-making systems and control systems via a Roadside Unit (RSU) for enabling a traffic safety system for connected and unconnected vehicles. The "connected vehicle traffic safety system," in addition to the exemplary hardware description above, refers to a system that is configured to provide communications from Vehicle to either another Vehicle (V2V) or to roadside Infrastructure (V2I) for creating an ecosystem of connected vehicles, operated by a controller (including but not limited to smart infrastructure equipment connected to traffic signal light controllers and traffic management systems, and others). The connected vehicle traffic safety system can include multiple interacting systems, whether located together or apart, that together perform processes as described herein.

The Onboard Unit (OBU)-equipped vehicle 15 includes an OBU or OB device 35 that privately and securely: a). transmits vehicle location, heading, elevation and speed to nearby vehicles ten times per second, b). receives location heading, elevation and speed from nearby vehicles, c). receives lane locations from the Roadside Unit (RSU) 30, d). receives traffic signal countdown from RSU 30, and e). receives associated signal phase to lane from RSU 30 to know which signal to obey. However, the U.S. Department of Transportation (DOT) defines three classes of OBU devices: i. Class 1: OBU built into the new vehicle, ii. Class 2: OBU available as an aftermarket device for older vehicles, cyclists and pedestrians, and iii. Class 3: OBU available as a smart phone app for drivers, cyclists and pedestrians. Creation and use of this data is not limited to vehicles, but can be created and used by other moving objects, such as pedestrians and bicycles.

The techniques described herein can be particularly useful for using an Onboard Unit (OBU) or OB device. While particular embodiments are described in terms of Onboard Unit (OBU), the techniques described herein are not limited to Onboard Unit (OBU) but can also use other Vehicle to Vehicle/Infrastructure/Traffic Management System (V2X) empowered software and hardware such as other smart automotive interactive communication modules.

The connected vehicle traffic safety system 10 further includes the vehicle detection device 25 as vehicle detectors. For detecting the non-Onboard Unit (OBU)-equipped vehicle 20, vehicle detectors are installed as "traps" meaning that two detectors are spaced such that the vehicle speed is determined by Rate=(Distance between detectors÷Time between detections). The direction of vehicle travel is determined by the detector actuated. Examples of vehicle detectors include inductor loops, radar and video detectors.

By indirectly connecting the non-Onboard Unit (OBU)-equipped vehicle 20 to the Onboard Unit (OBU)-equipped vehicle 15 the connected vehicle traffic safety system 10 can be effective in avoiding accidents and traffic congestion. The non-Onboard Unit (OBU)-equipped vehicle 20 and the Onboard Unit (OBU)-equipped vehicle 15 use real-time traffic data to provide proactive driver warnings for collisions with other vehicles and to warn drivers of red light violations before they occur. In addition to the non-Onboard Unit (OBU)-equipped vehicle 20 and the Onboard Unit (OBU)-equipped vehicle 15, the real-time traffic data may be created and used by other OBU-connected moving objects, such as pedestrians and bicycles. In this way, by providing a fully automated network of vehicles, pedestrians and bicycles aware of each other and their environment the connected vehicle traffic safety system 10 makes mobility safer.

In the Onboard Unit (OBU)-equipped vehicle 15, the Onboard Unit (OBU) 35 includes a wireless device 40 and a vehicle safety system 45. Likewise, the Roadside Unit (RSU) 30 includes a processor 50, a wireless transceiver 55, and a storage media 60 to store a software module 65. The Roadside Unit (RSU) 30 may be located at an intersection or near a roadway 70. The Roadside Unit (RSU) 30 may be coupled to a traffic signal controller 75 connected to a traffic signal 80. The Roadside Unit (RSU) 30 may be coupled to municipalities infrastructure 85 which in turn are connected to service providers infrastructure 90.

In a cloud, via a switch a RSU provisioning and network management server, a certification authority and a gateway to other networks of the municipalities infrastructure 85 may be connected to the Roadside Unit (RSU) 30. The municipalities infrastructure 85 may handle registrations, subscriptions, operations, rules, management and maintenance. The service providers infrastructure 90 may include an Original Equipment Manufacturer (OEM)/Internet Service Provider (ISP) applications server, a content and services server, and an OBU provisioning server. It should be appreciated that several other components may be included in the municipalities infrastructure 85 and the service providers infrastructure 90. However, the function and use of such equipment for a traffic control application are well known in the art and are not discussed further.

The vehicle detection device 25 may be located at an intersection or near the roadway 70 on which the non-Onboard Unit (OBU)-equipped vehicle 20 may travel. The vehicle detection device 25 may generate vehicle detection data 95 and transmit it to the Roadside Unit (RSU) 30 in a communication signal 100.

In operation, the vehicle detection device 25 is configured to generate the vehicle detection data 95 of the non-Onboard Unit (OBU)-equipped vehicle 20. The Roadside Unit (RSU) 30 may be configured to transmit wireless signals and receive corresponding responses from the wireless device 40 of the Onboard Unit (OBU)-equipped vehicle 15, and to send vehicle location data 105, direction heading data 110 and speed data 115, elevation data 117 from the OBU-equipped vehicle 15 to the traffic signal controller 75. The elevation data 117 is critical for overpasses as don't need to issue a crash warning based on latitude and longitude if the cars are on different levels of the overpass.

An example of the vehicle location data 105 is GPS co-ordinates, i.e., longitude and latitude co-ordinates of a global location on the surface of Earth by a Global Positioning System (GPS) such as via a Google Maps APP or via a hardware GPS chip. An example of the direction heading data 110 may be generated using two vehicle detectors of the vehicle detection device 25 on the roadway 70 based on actuations of the two vehicle detectors. Based on a relative location information of the two vehicle detectors on the roadway 70, a direction indication may be generated indicating a north (N), south(S), east (E), west (W), SE, ES, WS, or NW direction. An example of the speed data 115 may be a speed value generated using actuation timings of two vehicle detectors of the vehicle detection device 25 on the roadway 70.

The Roadside Unit (RSU) 30 receives the vehicle detection data 95 of the non-Onboard Unit (OBU)-equipped vehicle 20 and creates a proxy data wireless message 120 for the non-Onboard Unit (OBU)-equipped vehicle 20 based on the vehicle detection data 95 as if the non-Onboard Unit (OBU)-equipped vehicle 20 is equipped with an Onboard Unit (OBU). The Roadside Unit (RSU) 30 essentially mimics the proxy data wireless message 120 as a first Basic Safety Message (BSM) 125 for the non-Onboard Unit (OBU)-equipped vehicle 20 that would have been available to the Onboard Unit (OBU)-equipped vehicle 15 present nearby to enable the Onboard Unit (OBU)-equipped vehicle 15 equipped with the Onboard Unit (OBU) 35 to be aware of a presence of the non-Onboard Unit (OBU)-equipped vehicle 20.

The Roadside Unit (RSU) 30 detects the non-Onboard Unit (OBU)-equipped vehicle 20 based on the communication signal 100 from the vehicle detection device 25. The software module 65 of the Roadside Unit (RSU) 30 blends the proxy data wireless message 120 with a second Basic Safety Message (BSM) 130 of the Onboard Unit (OBU)-equipped vehicle 15 in the connected vehicle traffic safety system 10 configured for assisting traffic control and generating traffic safety warnings based on the proxy data wireless message 120 and the second Basic Safety Message (BSM) 130.

The software module 65 of the Roadside Unit (RSU) 30 may determine a location, a direction heading, an elevation and a speed of the non-Onboard Unit (OBU)-equipped vehicle 20 based on the communication signal 100 from the vehicle detection device 25. Based on the location, the direction heading and the speed of the non-Onboard Unit (OBU)-equipped vehicle 20 the software module 65 of the Roadside Unit (RSU) 30 creates the first Basic Safety Message (BSM) 125 for the non-Onboard Unit (OBU)-equipped vehicle 20 as the proxy data wireless message 120. The Roadside Unit (RSU) 30 transmits the proxy data wireless message 120 to the Onboard Unit (OBU)-equipped vehicle 15 present nearby as if the non-Onboard Unit (OBU)-equipped vehicle 20 is equipped with an Onboard Unit (OBU).

The software module 65 of the Roadside Unit (RSU) 30 may generate a first traffic warning 135 for a driver 140 of the Onboard Unit (OBU)-equipped vehicle 15 or a second traffic warning 145 for the vehicle safety system 45 of the Onboard Unit (OBU)-equipped vehicle 15 for initiating an automatic action 150 based on the proxy data wireless message 120 of the non-Onboard Unit (OBU)-equipped vehicle 20 and a Basic Safety Message (BSM) of any Onboard Unit (OBU)-equipped vehicle present nearby. An example of the automatic action 150 may be automatic breaking of a vehicle in case of an emergency when the driver 140 is too slow to break or inattentive.

In one embodiment, the first traffic warning 135 or the second traffic warning 145 may be generated as a software message 155 by the software module 65 of the Roadside Unit (RSU) 30. Otherwise, audio, haptic (common to chatter the braking system to simulate rumble strips) and/or visual warning signals may be generated or a combination with the software message 155 may be provided to the driver 140. Examples of the first traffic warning 135 include a wrong-way violation warning, a red light signal violation warning, a train collision warning, a nearest unoccupied parking space warning and/or a curve warning.

Figure 2:
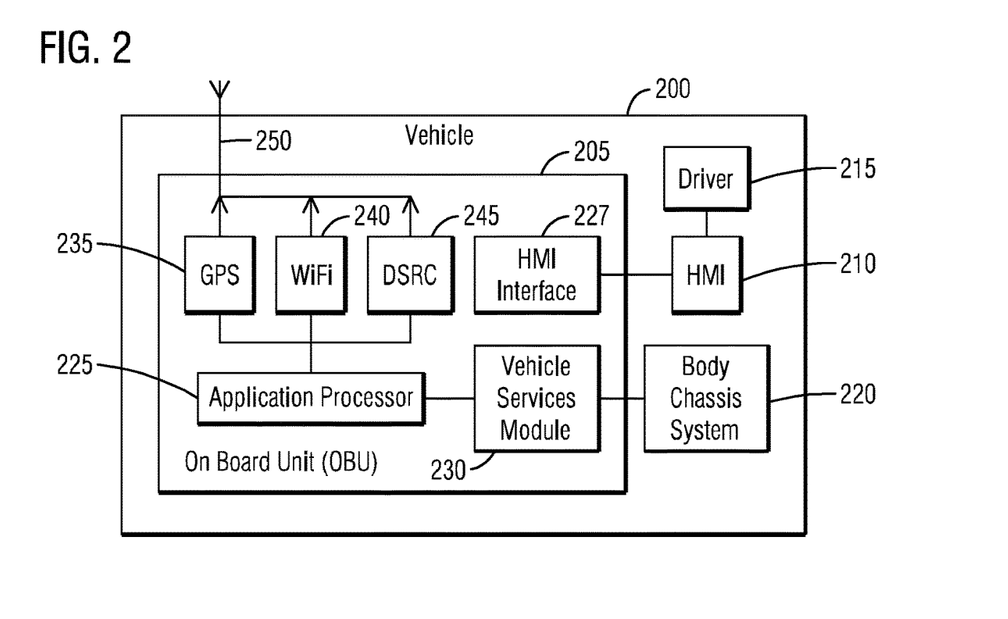
FIG. 2 illustrates a schematic of an Onboard Unit (OBU)-equipped vehicle equipped with an Onboard Unit (OBU) in accordance with an exemplary embodiment of the present invention.

Referring to FIG. 2, it illustrates a schematic of an Onboard Unit (OBU)-equipped vehicle 200 equipped with an Onboard Unit (OBU) 205 in accordance with an exemplary embodiment of the present invention. The OBU-equipped vehicle 200 may include a Human Machine Interface (HMI) 210 for a driver 215 to interface with the OBU 205. The OBU-equipped vehicle 200 may also include a body chassis system 220 to interface with the OBU 205.

In one embodiment, the OBU 205 may include an application processor 225, a HMI interface 227, and a vehicle services module 230. The OBU 205 may further include a GPS chip 235, a Wi-Fi transceiver 240, a Dedicated Short-Range Communications (DSRC) device 245, and an antenna 250 to which they are coupled for conducting wireless communications.

As shown, the HMI interface 227 is coupled to the HMI 210 and the vehicle services module 230 is coupled to the body chassis system 220. The GPS chip 235 provides GPS communications for determining and communicating location of the OBU-equipped vehicle 200. The Wi-Fi transceiver 240 provides communications to Wi-Fi hotspots and other ISP networks to connect the OBU-equipped vehicle 200 to the Internet. As a part of an intelligent transportation system (ITS), the DSRC device 245 may operate as a network node to provide dedicated short-range vehicular communications in 5.9 GHz band with bandwidth of 75 MHz and has an approximate range of 1000 m.

Figure 3:
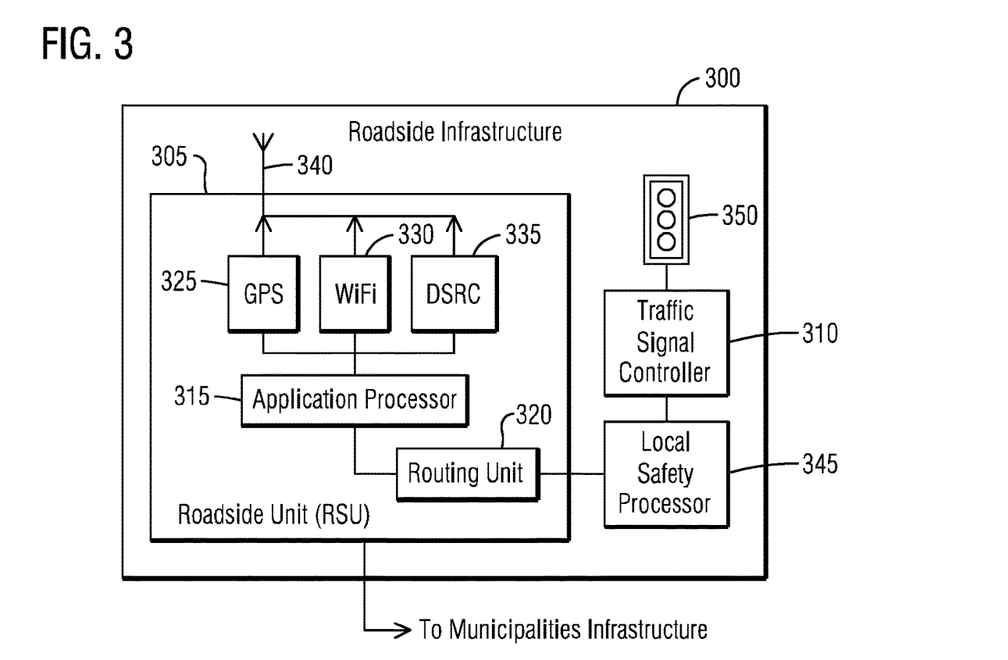
FIG. 3 illustrates a schematic of roadside infrastructure including a Roadside Unit (RSU) and a traffic signal controller in accordance with an exemplary embodiment of the present invention.

Turning now to FIG. 3, it illustrates a schematic of roadside infrastructure 300 including a Roadside Unit (RSU) 305 and a traffic signal controller 310 in accordance with an exemplary embodiment of the present invention. In one embodiment, the RSU 305 may include an application processor 315 and a routing unit 320. The RSU 305 may further include a GPS chip 325, a Wi-Fi transceiver 330, a Dedicated Short-Range Communications (DSRC) device 335, and an antenna 340 to which they are coupled for conducting wireless communications. GPS is one example of a location device. Others include beacons, dead reckoning and other navigation location services.

The routing unit 320 may be coupled to a local safety processor 345 which connects to the traffic signal controller 310 linked to a traffic signal 350. The routing unit 320 may further couple the RSU 305 to the municipalities infrastructure 85 of FIG. 1.

The GPS chip 325 provides GPS communications for determining and communicating location information of a non-OBU-equipped vehicle. The Wi-Fi transceiver 330 provides communications to Wi-Fi hotspots and other ISP networks to connect the RSU 305 to the Internet. As a part of an intelligent transportation system (ITS), the DSRC device 335 may operate as a network node to provide dedicated short-range vehicular communications in 5.9 GHz band with bandwidth of 75 MHz in an approximate range of 1000 m.

Figure 4:
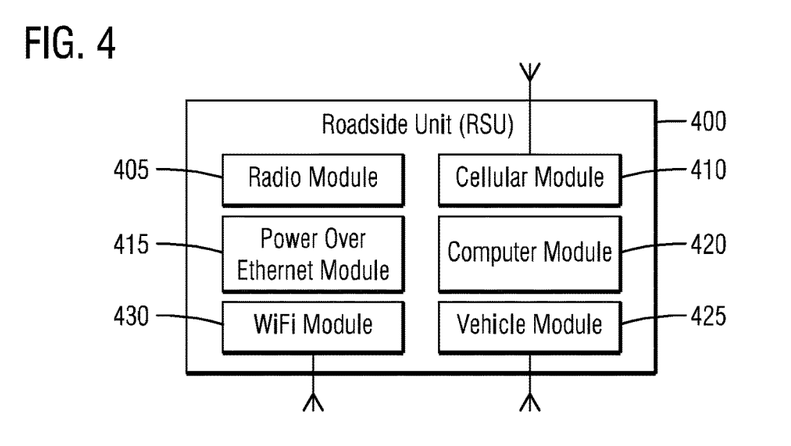
FIG. 4 illustrates a schematic of a Roadside Unit (RSU) in accordance with an exemplary embodiment of the present invention.

FIG. 4 illustrates a schematic of a Roadside Unit (RSU) 400 in accordance with another exemplary embodiment of the present invention. In one embodiment, the RSU 400 may include a radio module 405, a cellular module 410, a power over Ethernet module 415, a computer module 420, a vehicle module 425 and a Wi-Fi module 430. The cellular module 410 may provide mobile communications with cell phones of drivers. The power over Ethernet module 415 may provide a wired Internet connection to the RSU 400. The vehicle module 425 may support the non-Onboard Unit (OBU)-equipped vehicle 20 and the Onboard Unit (OBU)-equipped vehicle 15 related activities of the connected vehicle traffic safety system 10 of FIG. 1.

The radio module 405 may include a DSRC device to operate as a network node to provide dedicated short-range vehicular communications in 5.9 GHz band with bandwidth of 75 MHz in an approximate range of 1000 m. The computer module 420 may include a processor to execute a traffic control software stored in a storage device for the RSU 400. The Wi-Fi module 430 provides communications to Wi-Fi hotspots and other ISP networks to wirelessly connect the RSU 400 to the Internet.

Figure 5:
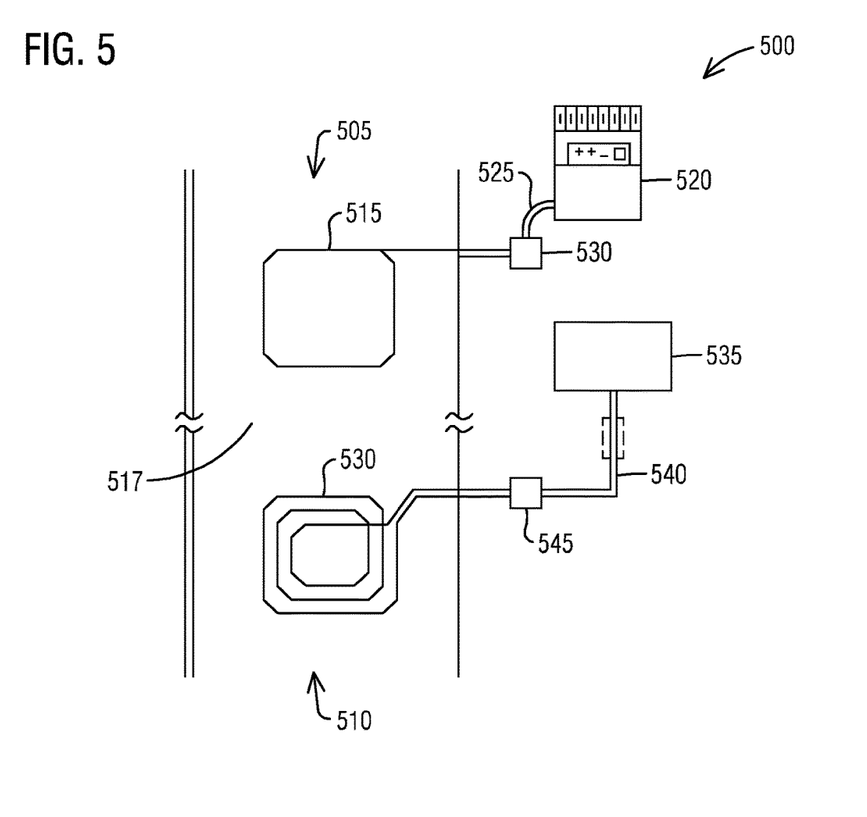
FIG. 5 illustrates a schematic of a vehicle detection device in accordance with an exemplary embodiment of the present invention.

As shown in FIG. 5, it illustrates a schematic of a vehicle detection device 500 in accordance with an exemplary embodiment of the present invention. The vehicle detection device 500 includes a vehicle detection loop, called inductive-loop traffic detectors to detect vehicles passing or arriving at a certain point, for instance approaching a traffic light or in the roadway traffic. For example, the vehicle detection device 500 may be either a loop sawcut vehicle detector 505 or a loop wire vehicle detector 510.

According to one embodiment, the loop sawcut vehicle detector 505 includes an insulated, electrically conducting sawcut loop 515, an electronics unit 520, a lead in cable 525 and a pullbox 530. The insulated, electrically conducting sawcut loop 515 is installed in the pavement of a roadway 517. The electronics unit 520 transmits energy into the sawcut loop 515 at frequencies between 10 kHz to 200 kHz via the lead-in cable 525 and the pullbox 530. The inductive-loop system behaves as a tuned electrical circuit in which the sawcut loop 515 and the lead-in cable 525 are the inductive elements. When a vehicle passes over the sawcut loop 515 or is stopped within the sawcut loop 515, the vehicle induces eddy currents in the sawcut loop 515, which decrease their inductance. The decreased inductance actuates the electronics unit 520 output relay or solid-state optically isolated output, which sends a pulse to a traffic signal controller signifying the passage or presence of a vehicle.

For the loop wire vehicle detector 510, an insulated, electrically conducting wire loop 530 is installed in the pavement of the roadway 517. An electronics unit 535 transmits energy into the wire loop 530 at frequencies between 10 kHz to 200 kHz via a lead-in cable 540 and a splice in pullbox 545. The inductive-loop system behaves as a tuned electrical circuit in which the wire loop 530 and the lead-in cable 540 are the inductive elements. Like the loop sawcut vehicle detector 505, when a vehicle passes over the wire loop 530 or is stopped within the wire loop 530, the electronics unit 535 output relay or solid-state optically isolated output sends a pulse to a traffic signal controller signifying the passage or presence of a vehicle.

Figure 6:
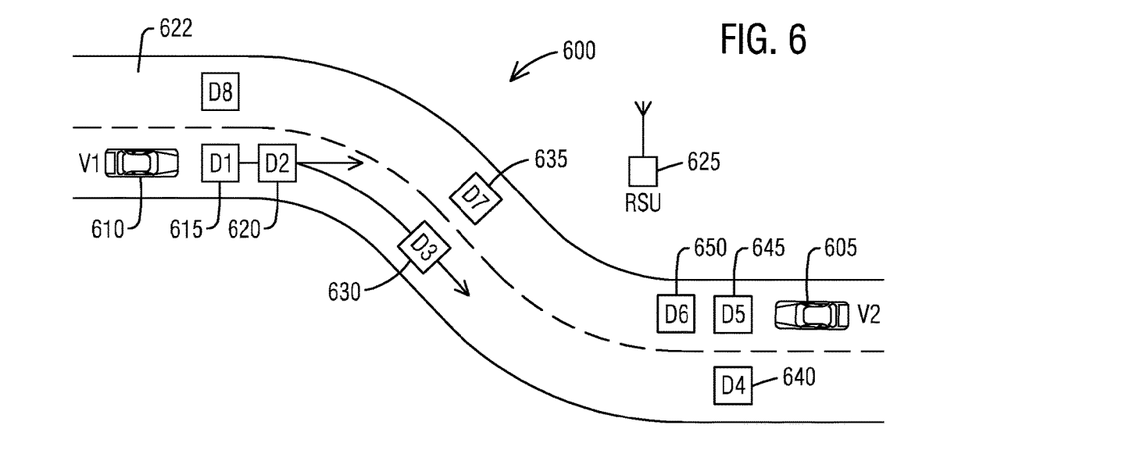
FIG. 6 illustrates a schematic of a curve warnings system in accordance with one illustrative embodiment of the present invention.

As seen in FIG. 6, it illustrates a schematic of a curve warnings system 600 in accordance with one illustrative embodiment of the present invention. In the FIG. 6, a vehicle V2 605 is equipped with an Onboard Unit (OBU) that can receive the location, heading and speed data from the OBUs of other vehicles in order to avoid crashes. In this case, a vehicle V1 610 is not equipped with an OBU, but poses a collision threat to the vehicle V2 605. The vehicle V1 610 travels across detectors D1 615 and D2 620 on a roadway 622 which may be inductive loop detectors, radar, video or other types. Knowing the distance and angular offset between the detectors D1 615 and D2 620, plus the time between actuations of the detectors D1 615 and D2 620, the location, heading and speed of the vehicle V1 610 may be determined.

A Roadside Unit (RSU) 625 converts this data to a Basic Safety Message (BSM) that is transmitted to nearby vehicles. As the vehicle V1 610 proceeds around the curve, a detector D3 630 or a detector D7 635 may be actuated. Again, using the distance and angular offset between the detectors D2 620 and D3 630, or D2 620 and D7 635, the BSM is updated by the RSU 625 to the new heading, location, elevation and speed of the vehicle V1 610. As the vehicle V1 610 travels further, detectors D4 640, D5 645 and D6 650 may be actuated by the vehicle V1 610. Again, the BSM transmitted by the RSU 625 is updated as previously described. If a combination of the detectors D1 615 and D2 620 are actuated, but a combination of the detectors D3 630, D4 640, D5 645, D6 650 and D7 635 are not actuated, the vehicle V1 610 has departed the roadway 622 indicated by a BSM transmitted by the RSU 625 with a location outside of the roadway 622, indicating to the vehicle V2 605 that the roadway 622 is clear of vehicles.

By using the roadway 622 lane geometry information, in one embodiment, the RSU 625 transmits a standard Message Access Profile (MAP) message that may be used in combination with BSM by the vehicle V2 605 for crash avoidance, curve speed warning or lane departure. Given a sufficient coverage of the roadway 622 by detectors such as the D1 615-D7 635 and analyzing the timing and sequence of detector actuations, a BSM for an unequipped vehicle such as the vehicle V1 610 can be transmitted by the RSU 625 continually as if the vehicle V1 610 were equipped with an OBU. For example, a trap based on the detectors D1 615 and D2 620 may create a Curve Speed Warning when the vehicle V1 610 is travelling faster than the speed advice sign for that curve.

Note that the detection devices D1 615-D7 635 described here are "presence detectors", meaning that a vehicle is either present or not present at the detector location. For example, the detection devices D1 615-D7 635 may be based on an induction loop such as the vehicle detection device 500 including the loop sawcut vehicle detector 505 or the loop wire vehicle detector 510. Other detection devices include Doppler radar, video, infrared, and others that can compute the location, speed, direction, elevation, weight and other attributes of moving objects. Embodiments of the present invention include those and other detection devices that can be used as inputs to create proxy messages as if the objects were equipped with a transmitting device.

Figure 7:
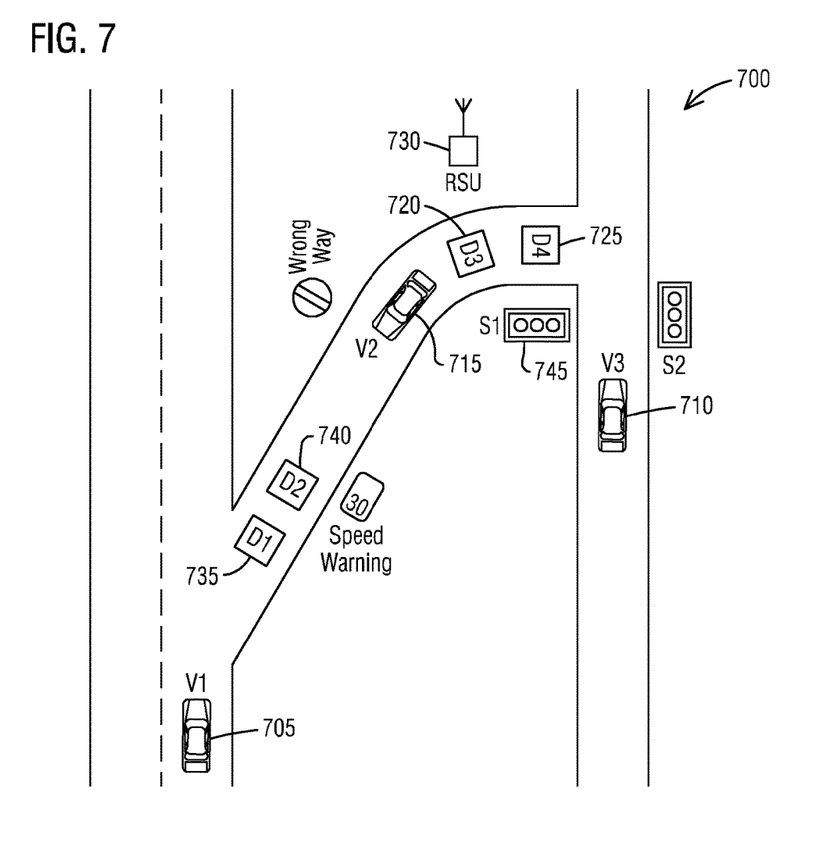
FIG. 7 illustrates a schematic of a wrong-way vehicle detection system in accordance with one illustrative embodiment of the present invention.

In FIG. 7, a schematic of a wrong-way vehicle detection system 700 is illustrated in accordance with one illustrative embodiment of the present invention. In this example, a vehicle V1 705 and a vehicle V3 710 are equipped with an Onboard Unit (OBU), while a vehicle V2 715 travelling on a wrong-way is unequipped with an OBU. A trap based on a detector D3 720 and a detector D4 725 detects the location, heading and speed of the vehicle V2 715 that is transmitted as a V2 Basic Safety Message (BSM) by a Roadside Unit (RSU) 730. This V2 BSM is received by an OBU of the vehicle V1 705 that determines that the vehicle V2 715 is entering the ramp in the wrong direction and on a collision course, which results in driver warnings to the vehicle V1 705 and the OBU equipped vehicle V3 710.

In another example, if the unequipped vehicle V2 715 is travelling in the right direction but at an excessive speed across a trap based on a detector D1 735 and a detector D2 740, the RSU 730 will transmit a curve speed warning as if the vehicle V2 715 were OBU equipped. The curve speed warning can be received by the OBU equipped vehicle V3 710 for lane-departure warning. As the unequipped vehicle V2 715 continues across the trap based on the detector D3 720 and the detector D4 725 at a speed that will violate a red light traffic signal S1 745, a red light violation warning is transmitted by the RSU 730 to the OBU equipped vehicle V3 710.

Figure 8:
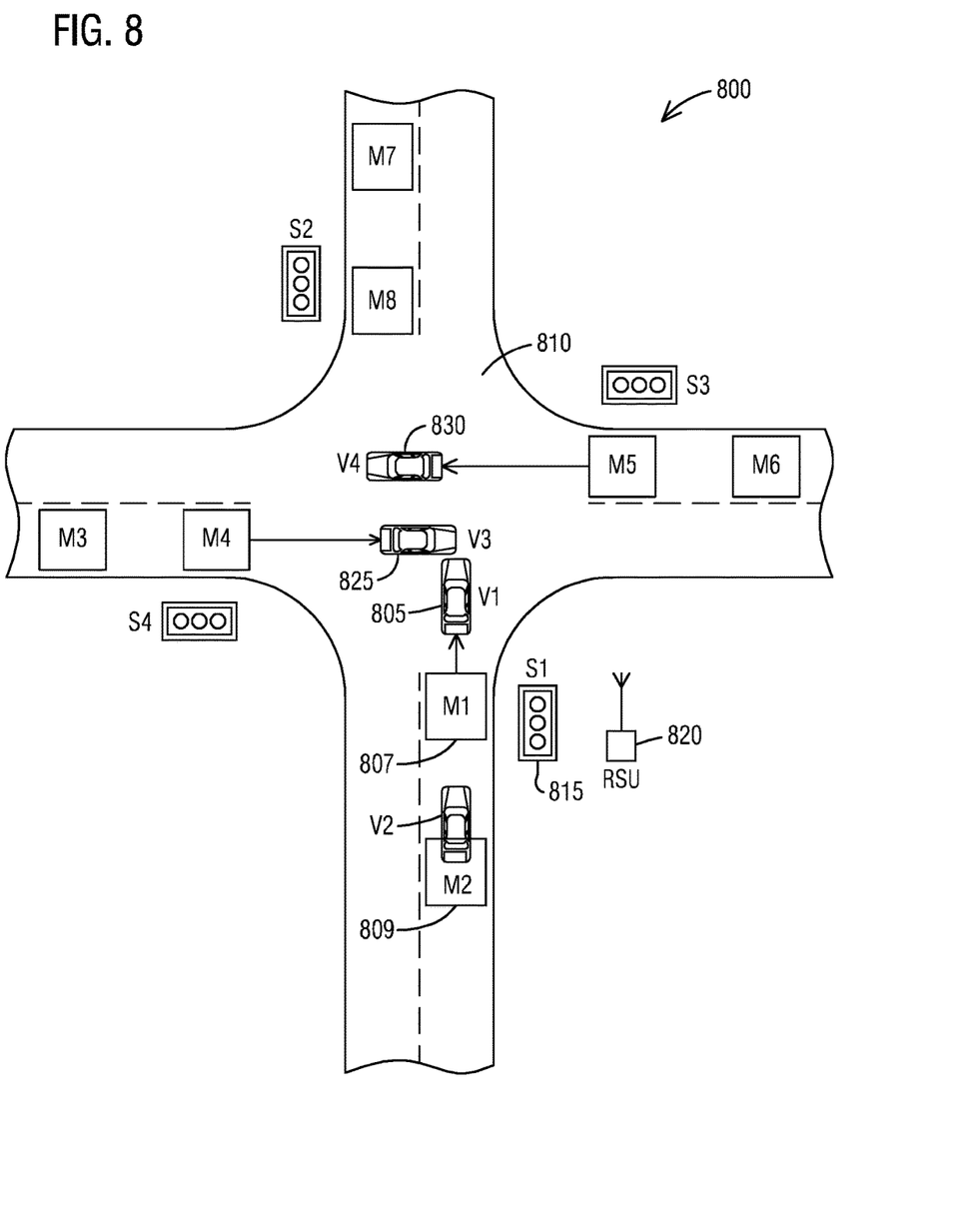
FIG. 8 illustrates a schematic of a red light violation warning for collision avoidance system in accordance with one illustrative embodiment of the present invention.

With regard to FIG. 8, it illustrates a schematic of a red light violation warning for collision avoidance system 800 in accordance with one illustrative embodiment of the present invention. In this example, an unequipped, i.e., without an OBU vehicle V1 805 has travelled across a trap M1 807, M2 809 and then proceeded through an intersection 810, violating a red traffic light signal S1 815. The red light violation is detected per U.S. Pat. No. 8,344,909, U.S. Pat. No. 8,531,520, U.S. Pat. No. 8,442,749 and/or U.S. Pat. No. 8,762,037, all of which are incorporated by reference herein in their entirety. The red light violation warning for collision avoidance system 800 uses the trap M1 807 and M2 809 as a trap to measure vehicle speed, and then compares occupancy of the trap M1 807 to a state of the red traffic light signal S1 815. If the vehicle V1 805 speed and direction indicates that a violation may occur, and if the trap M1 807 is not continuously occupied by the vehicle V1 805 during the red traffic light signal S1 815 having a red phase or state, a RSU 820 determines that the vehicle V1 805 has violated the red state of the red traffic light signal S1 815 and then the RSU 820 transmits a red light violation warning to nearby vehicles and pedestrians using standard connected vehicle messages known by OBU equipped vehicles.

Without the red light violation warning for collision avoidance system 800, an OBU equipped vehicle V3 825 will likely crash with the vehicle V1 805. With the red light violation warning for collision avoidance system 800, a driver of the OBU equipped vehicle V3 825 will receive a collision avoidance warning and an antilock braking system of the OBU equipped vehicle V3 825 will receive a collision avoidance warning for automatic braking. The OBU equipped vehicle V3 825 may also warn an unequipped vehicle V4 830 by an audible or a visual warning to a driver of the unequipped vehicle V4 830.

Figure 9:
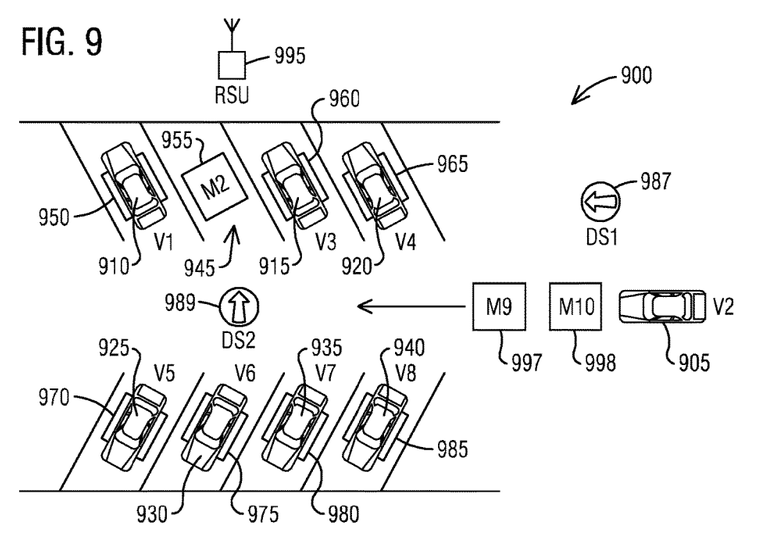
FIG. 9 illustrates a schematic of a parking guidance system in accordance with another illustrative embodiment of the present invention.

With respect to FIG. 9, it illustrates a schematic of a parking guidance system 900 in accordance with another illustrative embodiment of the present invention. In this example, an OBU equipped vehicle V2 905 is seeking the nearest unoccupied parking space. Without the parking guidance system 900, a driver of the OBU equipped vehicle V2 905 would be required to visually inspect parking spaces occupied by vehicles V1 910 and V3-V8 915, 920, 925, 930, 935, 940 in order to find a single unoccupied space 945 as shown.

Studies indicate that approximately 30% to 40% of urban traffic consists of drivers seeking a parking space. Existing parking guidance systems typically utilize a vehicle detector per parking space identified as traps M1-M8 950, 955, 960, 965, 970, 975, 980, 985 above, such as inductive loops, video, radar and others. Unoccupied spaces are sensed and reported to the driver of the OBU equipped vehicle V2 905 using roadside signs DS1 987, DS2 989, which guide the OBU equipped vehicle V2 905 to the single unoccupied space 945.

If the vehicles V1-V8 910, 905, 915, 920, 925, 930, 935, 940 are all equipped with OBU devices then they may transmit a Basic Safety Message (BSM) consisting of vehicle location, heading and speed. The parking guidance system 900 may track the BSM of each vehicle to each parking space and then determine unoccupied spaces by matching the location of each space to the location of the vehicles.

When the OBU equipped vehicle V2 905 approaches an RSU 995 it guides the OBU equipped vehicle V2 905 to the single unoccupied space 945 using an in vehicle APP or a smart phone APP by constantly comparing V2 BSM to the single unoccupied space 945 location. If unequipped with OBU vehicles are mixed with OBU equipped vehicles, the parking guidance system 900 may use traps M1-M8 950, 955, 960, 965, 970, 975, 980, 985 and M9-M10 997, 998 to create proxy BSMs. For example, if the vehicle V7 935 is unequipped, the parking space M7 980 reports that the vehicle V7 935 occupies that parking space. The RSU 995 may create and broadcast a BSM for the vehicle V7 935 as if the vehicle V7 935 were equipped with an OBU. Likewise, if the vehicle V2 905 were unequipped, the RSU 995 may create a BSM for the vehicle V2 905 using the traps M9 997 and M10 998 as if the vehicle V2 905 were equipped with an OBU.

Figure 10:
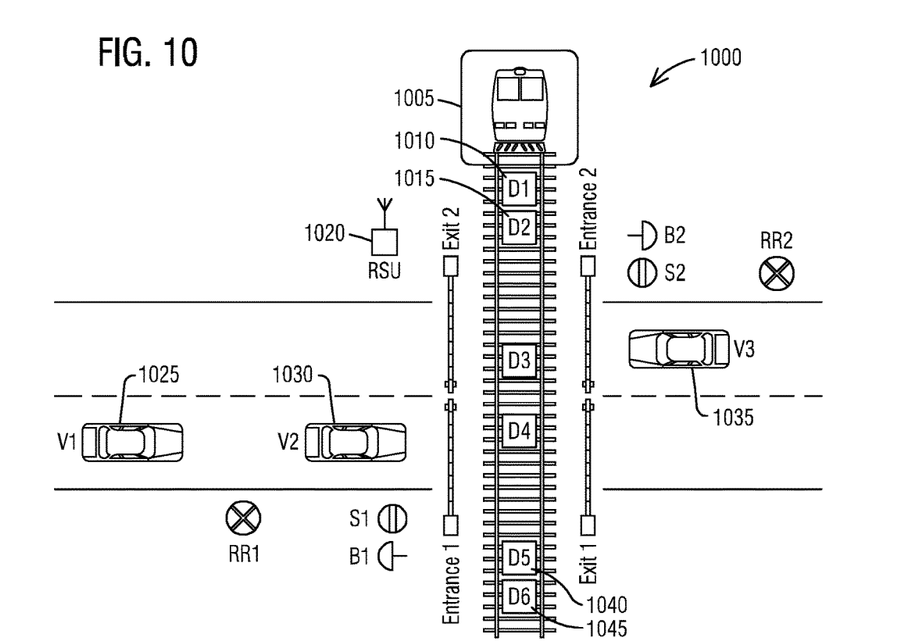
FIG. 10 illustrates a schematic of a train collision warning system in accordance with another illustrative embodiment of the present invention.

Now referring to FIG. 10, it illustrates a schematic of a train collision warning system 1000 in accordance with another illustrative embodiment of the present invention. In this example, a TRAIN 1005 is not equipped with an OBU. The rail crossing signals are typically actuated by a trap based on a detector D1 1010, a detector D2 1015 that is used by a RSU 1020 to determine the location, heading and speed of the TRAIN 1005. The train collision warning system 1000 may broadcast this information as a BSM to OBU equipped vehicles V1-V3 1025, 1030, and 1035 in order to warn inattentive drivers or to actuate automatic braking if a crash is predicted. Many other similar scenarios may deploy roadside vehicle detection to create RSU proxy wireless messages as if the unequipped vehicles are equipped with OBUs. For example, the crash warning to the drivers does not involve the crossing gates or railroad grade crossing signals that might be ignored by a distracted driver.

There are many advantages of the train collision warning system 1000. FIG. 10 depicts an embodiment of the train collision warning system 1000 consisting of the Roadside Unit (RSU) 1020 wherein a). the RSU 1020 mimics the vehicle V1 1025 messages that would have been available to the vehicle V2 1030 as if the vehicle V1 1025 were equipped with an OBU, b). the RSU 1020 blends the equipped vehicle V2 1030 and the unequipped vehicle V1 1025 messages during years until all vehicles are equipped with an OBU, and c). "future proofs" today's equipment installations. There is no need to replace equipment for smart cars later.

For example, equipped V2 BSM would be received by the Roadside Unit (RSU) 1020, along with detections by detectors D5 1040 and D6 1045. Comparing the location and time of the detectors D5 1040 and D6 1045 detections to the V2 BSM, the Roadside Unit (RSU) 1020 would determine that the vehicle V2 1030 is equipped and the Roadside Unit (RSU) 1020 may not mimic a BSM created from the detectors D5 1040 and D6 1045. This "blending" of OBU equipped and unequipped Basic Safety Messages (BSMs) effectively deploys the crash avoidance of unequipped vehicles by OBU equipped vehicles.

Roadside Unit (RSU) 1020 software such as the software module 65 of the Roadside Unit (RSU) 30 combines the roadway lane placement geometries with the detectors D1-D8 outputs in order to create and transmit Connected Vehicle SAE Standard J2735 messages to nearby OBU equipped vehicles including: a). Basic Safety Message (BSM) containing location, heading and speed of the vehicle V2 1030 over the detectors, b). Lane Placement (MAP) message of the exit ramp lane geometries, c). Curve speed warning message, and d). Lane departure warning message.

Every new OBU equipped vehicle may receive J2735 standard messages via 5.9 GHz DSRC for driver safety. In one embodiment, a significant percentage of all vehicles must be equipped with OBUs for the connected vehicle traffic safety system 10 of FIG. 1 to be effective. As an alternative, each vehicle could be equipped with an aftermarket Class 2 OBU or with a Class 3 smart phone APP, along with legislation requiring their purchase and use. The OBU equipped vehicles supplement the received OBU messages with vehicle sensor data such as front radar, back radar, side radar, backup cameras and other devices to detect unequipped vehicles, pedestrians and cyclists.

Note that embodiments of the present invention are not limited to Basic Safety Message (BSM), Message Access Profile (MAP) and Signal Phase and Timing (SPAT) as the J7235 standard includes a rich set of messages that may be transmitted by the connected vehicle traffic safety system 10 of FIG. 1 as a proxy. For example, the connected vehicle traffic safety system 10 may identify Emergency Vehicles using license plate optical character recognition (OCR), then broadcast Emergency Vehicle Alert (EVA) standard J2735 message to nearby vehicles as if the unequipped emergency vehicle were broadcasting the EVA continuously while in code (lights and siren). The connected vehicle traffic safety system 10 may similarly construct and broadcast all other J2735 messages that can be received and used by new, OBU equipped vehicles.

Figure 11:
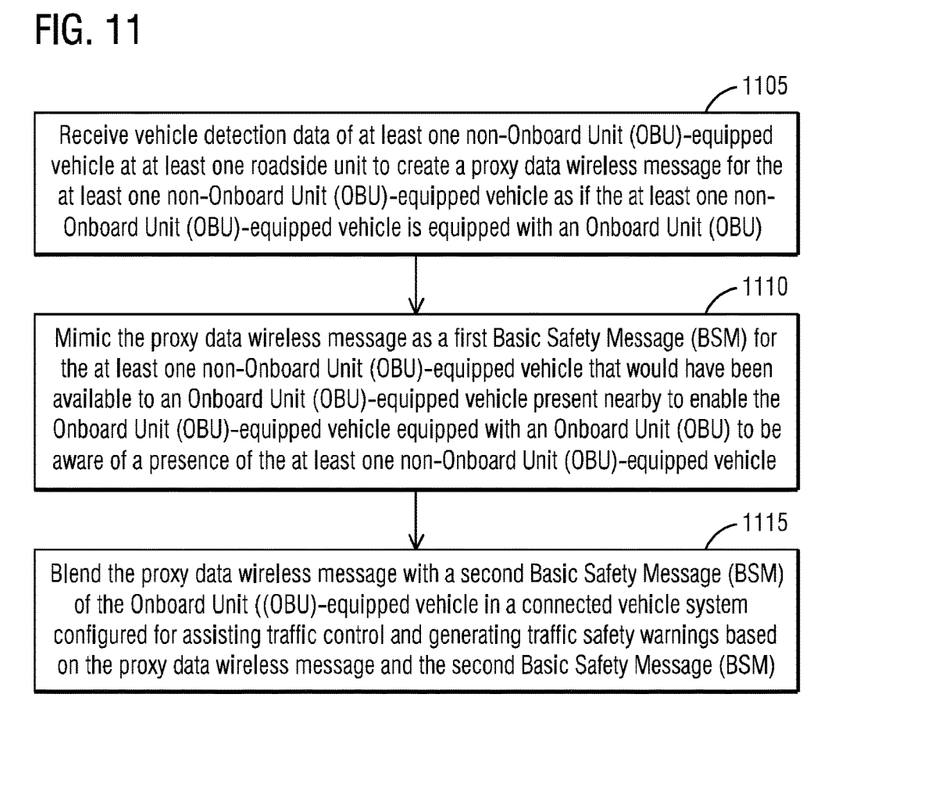
FIG. 11 illustrates a flow chart of a method of controlling and monitoring traffic of vehicles on roadways for generating traffic safety warnings in accordance with an exemplary embodiment of the present invention.

FIG. 11 illustrates a flow chart of a method 1100 of controlling and monitoring traffic of connected and unconnected vehicles on roadways for generating traffic safety warnings for both the connected and unconnected vehicles in accordance with an exemplary embodiment of the present invention. Reference is made to the elements and features described in FIGS. 1-10. It should be appreciated that some steps are not required to be performed in any particular order, and that some steps are optional.

In step 1105, the method 1100 may include receiving vehicle detection data of the non-Onboard Unit (OBU)-equipped vehicle 20 at the Roadside Unit (RSU) 30 to create the proxy data wireless message 120 for the non-Onboard Unit (OBU)-equipped vehicle 20 as if the non-Onboard Unit (OBU)-equipped vehicle 20 is equipped with an Onboard Unit (OBU). In step 1110, the method 1100 may further include mimicking the proxy data wireless message 120 as a first Basic Safety Message (BSM) for the non-Onboard Unit (OBU)-equipped vehicle 20 that would have been available to the Onboard Unit (OBU)-equipped vehicle 15 present nearby to enable the Onboard Unit (OBU)-equipped vehicle 15 equipped with an Onboard Unit (OBU) to be aware of a presence of the non-Onboard Unit (OBU)-equipped vehicle 20. In step 1115, the method 1100 may further include blending the proxy data wireless message 120 with a second Basic Safety Message (BSM) of the Onboard Unit (OBU)-equipped vehicle 15 in the connected vehicle traffic safety system 10 configured for assisting traffic control and generating traffic safety warnings based on the proxy data wireless message 120 and the second Basic Safety Message (BSM).

The connected vehicle traffic safety system 10 may use Dedicated Short-Range Communications (DSRC) as a medium range wireless communication channel dedicated to OBU vehicles to provide communications from Vehicle to either another Vehicle (V2V) or to roadside Infrastructure (V2I). On-Board-Units (OBUs) may be retrofitted to existing cars or built into new cars, with the goal of creating an ecosystem of connected vehicles.

As the primary threat to any vehicle comes from other vehicles, the connected vehicle traffic safety system 10 may enable vehicles to exchange information about themselves with other vehicles in the vicinity, and vice versa. The OBU vehicles could communicate highly accurate information such as speed, acceleration, steering angle, existence of a trailer, failure of a headlight or brake light, etc—to offer near-instantaneous feedback to enable evasive or preventive action. Such information would provide highly reliable, real-time situational awareness based on which smart decisions can be taken.

With the use of smart infrastructure equipment connected to weather/environmental systems, traffic signal light controllers and traffic management systems, the connected vehicle traffic safety system 10 may enable the OBU vehicles to now make use of real-time information to make smarter and safer decisions. The OBU vehicles are enabled to know the status of infrastructure, for example the approaching traffic light. In this way, the OBU vehicles are better equipped to make decisions that affect travel time, routes and fuel consumption.

Delivering dynamic information to mobile devices (both in-vehicle or nomadic handheld devices such as smart phones or tablets), the connected vehicle traffic safety system 10 may alert drivers to roadway features such as school zones, high hazard locations, parking locations and traffic restrictions (e.g., one-way roads, no-left-turn intersections, etc.).

The connected vehicle traffic safety system 10 may enable DSRC empowered Vehicle-to-Pedestrian communication through an "APP." The connected vehicle traffic safety system 10 may make pedestrians an active part of the V2V and V2I landscape through their smart phones. In this case the vehicle OBU operating on 5.9 GHz DSRC is incompatible with typical smart phones that include Wi-Fi, Bluetooth and cellular. Here, the RSU acts as a media translator that forwards BSMs of smart phone Wi-Fi to vehicles DSRC. Similarly, the BSM of vehicle DSRC is forwarded to pedestrian Wi-Fi devices. That way both vehicle and pedestrian devices calculate crash trajectories to issue warnings to both vehicles and pedestrians.

Embodiments of the present invention provide a method to translate standard messages among incompatible communications media (devices, protocols) types comprising an RSU and two or more OBUs operating on different communications media, where the RSU 30 includes two or more communications media, each of which is compatible with at least one OBU communications media. The RSU 30 translates the messages from an OBU operating on one communications media to messages to OBU operating on different communications media. Smart phones do not have DSRC that is mandated on new vehicles. In The connected vehicle traffic safety system 10, pedestrians in the street are made to appear as DSRC cars on a collision trajectory by using the RSU 30 as a communications media translator. The BSMs from the cars to the smart phones and from the smart phones to the cars have exactly the same data payload, just on different wireless bands. DSRC is used for the cars and Wi-Fi for the smart phones.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A connected vehicle traffic safety system, comprising:
   at least one roadside unit located at an intersection or near a roadway, the roadside unit comprising at least a processor and a wireless transceiver, the roadside unit configured to transmit wireless signals and receive corresponding responses from a corresponding wireless device of an Onboard Unit (OBU)-equipped vehicle, and to send at least one of vehicle location data, direction heading data, elevation data and speed data from the OBU-equipped vehicle to a traffic signal controller; and
   a vehicle detection device disposed on or near the roadway on which at least one non-Onboard Unit (OBU)-equipped vehicle is travelling, the vehicle detection device is configured to generate vehicle detection data of the at least one non-Onboard Unit (OBU)-equipped vehicle,
   wherein the at least one roadside unit is configured to:
      receive the vehicle detection data of the at least one non-Onboard Unit (OBU)-equipped vehicle to create a proxy data wireless message for the at least one non-Onboard Unit (OBU)-equipped vehicle as if the at least one non-Onboard Unit (OBU)-equipped vehicle is equipped with an Onboard Unit (OBU); and
      mimic the proxy data wireless message as a first Basic Safety Message (BSM) for the at least one non-Onboard Unit (OBU)-equipped vehicle that would have been available to the Onboard Unit (OBU)-equipped vehicle present nearby to enable the Onboard Unit (OBU)-equipped vehicle equipped with an Onboard Unit (OBU) to be aware of a presence of the at least one non-Onboard Unit (OBU)-equipped vehicle.

2. The system of claim 1, wherein the at least one roadside unit to:
blend the proxy data wireless message with a second Basic Safety Message (BSM) of the Onboard Unit (OBU)-equipped vehicle in a connected vehicle system configured for assisting traffic control and generating traffic safety warnings based on the proxy data wireless message and the second Basic Safety Message (BSM), wherein the at least one roadside unit to detect the at least one non-Onboard Unit (OBU)-equipped vehicle based on a signal from the vehicle detection device.

3. The system of claim 2, wherein the at least one roadside unit to:
determine a location, a direction heading, an elevation and a speed of the at least one non-Onboard Unit (OBU)-equipped vehicle based on the signal from the vehicle detection device; and
create the first Basic Safety Message (BSM) for the at least one non-Onboard Unit (OBU)-equipped vehicle based on the location, the direction heading, the elevation and the speed of the at least one non-Onboard Unit (OBU)-equipped vehicle as the proxy data wireless message.

4. The system of claim 3, wherein the at least one roadside unit to:
transmit the proxy data wireless message to the Onboard Unit (OBU)-equipped vehicle present nearby as if the at least one non-Onboard Unit (OBU)-equipped vehicle is equipped with an Onboard Unit (OBU).

5. The system of claim 4, wherein the at least one roadside unit to:
generate a first traffic warning for a driver of the Onboard Unit (OBU)-equipped vehicle or a second traffic warning for a vehicle safety system of the Onboard Unit (OBU)-equipped vehicle for initiating an automatic action based on the proxy data wireless message of the at least one non-Onboard Unit (OBU)-equipped vehicle and a Basic Safety Message (BSM) of any Onboard Unit (OBU)-equipped vehicle present nearby.

6. The system of claim 1, wherein the at least one roadside unit to:
generate a software message for at least one of a wrong-way violation, a red light signal violation, a train collision warning, a nearest unoccupied parking space and a curve warning.

* * * * *